US009940291B2

(12) United States Patent
Bacha et al.

(10) Patent No.: US 9,940,291 B2
(45) Date of Patent: Apr. 10, 2018

(54) ASSIGNING PROCESSORS TO MEMORY MAPPED CONFIGURATION (71) Applicant: Hewlett Packard Enterprise Development LP, Houston, TX (US)

(72) Inventors: Anys Bacha, Dublin, OH (US); Thanh Minh Pham, Elk Grove, CA (US); Thomas Joseph Gorenc, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 152 days.

(21) Appl. No.: 14/763,501

(22) PCT Filed: Jan. 29, 2013

(86) PCT No.: PCT/US2013/023552
§ 371 (c)(1),
(2) Date: Jul. 24, 2015

(87) PCT Pub. No.: WO2014/120113
PCT Pub. Date: Aug. 7, 2014

(65) Prior Publication Data
US 2015/0356049 A1 Dec. 10, 2015

(51) Int. Cl.
*G06F 13/42* (2006.01)
*G06F 1/32* (2006.01)
(52) U.S. Cl.
CPC ........ *G06F 13/4221* (2013.01); *G06F 1/3296* (2013.01); *G06F 2213/0024* (2013.01)

(58) Field of Classification Search
CPC .... G06F 13/42; G06F 1/32; G06F 2213/0024; G06F 13/4221
See application file for complete search history.

(56) References Cited

U.S. PATENT DOCUMENTS 5,481,738 A * 1/1996 Bartow ................. G06F 13/122
340/3.4
6,070,207 A * 5/2000 Bell ..................... G06F 13/4081
370/402

(Continued)

FOREIGN PATENT DOCUMENTS

CN 1636190 7/2005
CN 1967517 5/2007

(Continued)

OTHER PUBLICATIONS

P.G. Etchegoin et al, "Polarization-dependent effects in surface-enhanced Raman scattering (SERS)" Physical Chemistry Chemical Physics,vol. 8, No. 22, Jan. 1, 2006, p. 2624, XP055222583, GB ISSN: 1463-9076, DOI: 10.1039/b603725a, 5 Pgs.

(Continued)

*Primary Examiner* — Steven Snyder
*Assistant Examiner* — Christopher A Daley
(74) *Attorney, Agent, or Firm* — Hewlett Packard Enterprise Patent Department (57) ABSTRACT Embodiments herein relate to assigning processors to a memory mapped configuration. The processors having access to different buses of a Peripheral Component Interconnect (PCI) segment are quiesced. The quiesced processors are assigned a memory mapped configuration.

20 Claims, 4 Drawing Sheets

(56) References Cited

U.S. PATENT DOCUMENTS

| | | | |
|---|---|---|---|
| 6,092,170 A * | 7/2000 | Kori | G06F 12/1081 710/26 |
| 6,704,831 B1 * | 3/2004 | Avery | G06F 13/404 710/310 |
| 6,738,882 B1 * | 5/2004 | Gau | G11C 29/56 711/170 |
| 6,990,685 B1 | 1/2006 | Christensen et al. | |
| 7,185,135 B1 | 2/2007 | Briggs et al. | |
| 7,356,636 B2 | 4/2008 | Torudbakken et al. | |
| 7,447,822 B2 * | 11/2008 | Wu | G06F 13/4081 710/104 |
| 7,650,259 B2 * | 1/2010 | Blackmon | G06F 11/3428 702/182 |
| 7,827,333 B1 * | 11/2010 | Wyatt | G06F 12/0653 710/104 |
| 8,250,348 B2 | 8/2012 | Davis et al. | |
| 8,429,323 B2 * | 4/2013 | Engebretsen | G06F 13/404 710/305 |
| 8,949,474 B1 * | 2/2015 | Swarbrick | G06F 12/10 709/218 |
| 2001/0039600 A1 * | 11/2001 | Brooks | H04L 12/2801 710/307 |
| 2004/0236564 A1 * | 11/2004 | Oshins | G01B 31/318357 703/25 |
| 2005/0114639 A1 | 5/2005 | Zimmer | |
| 2005/0147117 A1 | 7/2005 | Pettey et al. | |
| 2006/0265576 A1 | 11/2006 | Davis et al. | |
| 2007/0097949 A1 | 5/2007 | Boyd et al. | |
| 2010/0161912 A1 * | 6/2010 | Daniel | H04L 67/1097 711/147 |
| 2010/0211717 A1 | 8/2010 | Uehara et al. | |
| 2011/0276779 A1 * | 11/2011 | Engebretsen | G06F 13/404 711/209 |
| 2012/0212732 A1 | 8/2012 | Santori | |
| 2012/0216022 A1 | 8/2012 | Craddock et al. | |
| 2014/0006659 A1 * | 1/2014 | Foong | G06F 12/063 710/74 |
| 2016/0012003 A1 * | 1/2016 | Chawla | G06F 13/102 710/308 |

FOREIGN PATENT DOCUMENTS

| | | |
|---|---|---|
| EP | 1857810 | 11/2007 |
| TW | 200839513 A | 10/2008 |
| WO | WO-2012161683 | 11/2012 |

OTHER PUBLICATIONS

Hong Wei et al, "Polarization Dependence of Surface-Enhanced Raman Scattering in Gold Nanoparticle-Nanowire Systems", Nano Letters, American Chemical Society, US, vol. 8; No. 8; Jan. 1, 2008, pp. 2497-2502, XP007918913, ISSN: 1530-6984, DOI: 10.1021/NL8015297, 6 Pgs.

International Search Report and Written Opinion received in PCT Application No. PCT/US2013/023552, dated Oct. 25, 2013, 9 pgs.

Dong Wei; "PCI-sig Engineering Change Notice", <http://www.pcisig.com/specifications/conventional/pci_firmware/PCI_FW_Slot_Power_ECN_website.pdf>, Jan. 23, 2007, 5 pps.

* cited by examiner

FIG. 1A 32-bit memory mapped configuration (before quiescence)

FIG. 1B 64-bit memory mapped configuration (after quiescence)

ASSIGNING PROCESSORS TO MEMORY MAPPED CONFIGURATION

BACKGROUND

Due to recent innovations in technology, users are seeking larger amounts of Input/Output (I/O) resources. However, due to I/O standards and/or bandwidth limitations, devices are unable to support a greater number of I/O devices to provide the I/O resources. System vendors are challenged to provide users with a greater amount of I/O resources.

BRIEF DESCRIPTION OF THE DRAWINGS

The following detailed description references the drawings, wherein.

DETAILED DESCRIPTION

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Due to the dynamics of the information era and its demanding nature, the bar for IT companies to produce equipment that can accommodate a large amount of I/O resources is constantly being raised. For example, having an ability to support a large amount of I/O resources is becoming highly valued for virtualization, as more guest operating systems (OS) try to claim ownership of such assets. Therefore, with a number of I/O cards available on device, such as high-end systems, increasing and more virtual functions being added to PCI Express (PCIe) devices, PCI bus numbers are becoming increasingly scarce within a single PCI segment.

By supporting multiple PCI segments, vendors may be able to provide more bus numbers. However, supporting multiple PCI segments generally requires use of memory mapped I/O ranges that are above 4 GB, known as Memory Mapped Configuration (MMCFG). This poses a problem for early firmware code that needs to access resources in the MMCFG space while still in 32-bit mode. Also most vendors provide hardware initialization firmware packages that are configured for 32-bit support. Thus, supporting multiple PCI segments during early boot creates several challenges. Such challenges may include a need to modify vendor provided packages to operate in 64-bit mode, which in turn can lead to supporting more complex code that results in delaying product releases.

Embodiments may allow for supporting a single PCI segment during early boot and then using a processor to properly enable additional PCI segments prior to handing off system resources to an OS. For example, a master processor may quiesce one or more slave processors running on a device. Each of the processors may have access to different buses of a Peripheral Component Interconnect (PCI) segment using a 32-bit based memory mapped configuration. A service unit may switch to a 64-bit memory mapped configuration after the master processor indicates the one or more slaves processors are quiesced. Each of the processors may be assigned to one of a plurality of instances of the PCI segment after the service unit switches to the 64-bit memory mapped configuration. Each of these instances may have access to all of the buses of the PCI segment.

Thus, by postponing enablement of multiple instances of PCI segments until hardware initialization is complete, embodiments may provide greater PCI bus numbers while still allowing for system firmware code that is dependent on a single PCI segment configuration to run unmodified. As a result, embodiments may be simple to implement because a complexity associated with re-writing 32-bit code to make it 64-bit compliant, is reduced or eliminated.

This further may translate in to savings in development schedules and on time product releases. In addition, enabling multiple PCI segments according to embodiments allows for an easier exchange of firmware packages between hardware vendors. For example, vendors may be able construct their packages to work in 32-bit mode only, as opposed to handling multiple modes (e.g., 32-bit and 64-bit modes). Having packages support a single mode may reduce development and validation cycles needed to support multiple modes. Also, embodiments may use industry standard interfaces such as SMBus, thus allowing for ease of implementation.

Figure 1A:
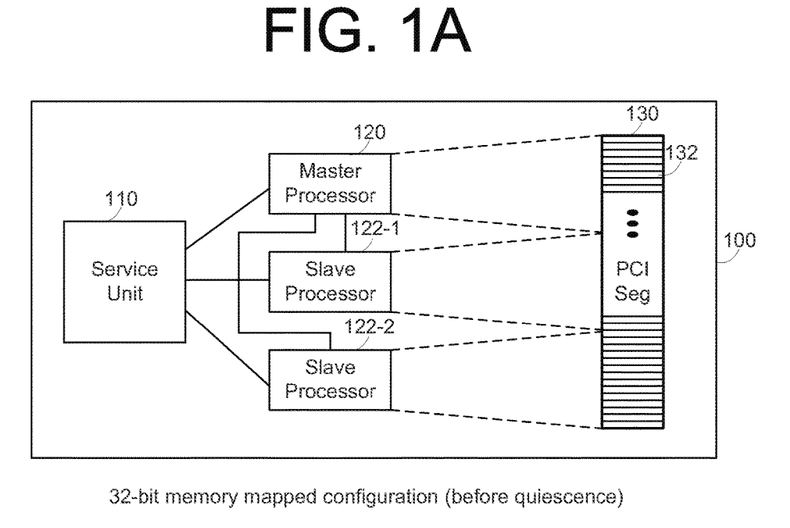
FIGS. 1A and 1B are example block diagrams of a device for assigning processors to a memory mapped configuration.
Figure 1B:
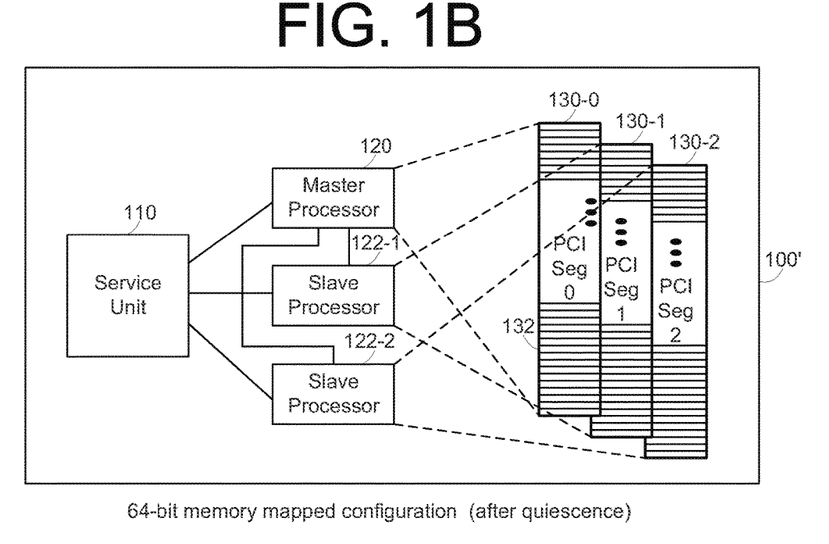

Referring now to the drawings, FIGS. 1A and 1B are example block diagrams of a device 100 for assigning processors 120, 122-1 and 122-2 to a memory mapped configuration. The device 100 may be, for example, a server, a secure microprocessor, a notebook computer, a desktop computer, an all-in-one system, a network device, a controller, a wireless device, or any other type of device that is to interface with a Peripheral Component Interconnect (PCI).

The term PCI may refer to part of the PCI Local Bus standard and/or a local computer bus for attaching hardware devices in a computer. The PCI bus may support functions found on a processor bus, but in a standardized format that is independent of any particular processor. Devices connected to the bus may appear to the processor to be connected directly to the processor bus, and may be assigned addresses in the processor's address space. The devices may be fitted onto a motherboard itself (e.g. a planar device) or an expansion card that fits into a slot. Example PCI cards may include network cards, sound cards, modems, extra ports such as USB or serial, TV tuner cards, disk controllers and the like.

PCI supports both 32-bit and 64-bit addresses for memory space. As the device 100 boots, BIOS or System firmware (not shown) assigns regions of memory space in the PCI address domain to PCI peripheral devices. A base address of a region is stored in the base address register of the device's PCI configuration space. The size of each region is generally a power of two, and the assigned base address is aligned on a boundary equal to the size of the region. PCI peripheral devices in memory space are memory-mapped into a host address domain, such as a processor's address space, so that data access to any device can be performed by the processor's native load or store instructions. Each PCI peripheral device is identified by a bus number, a device number, and a function number. The PCI specification permits a single system or segment to host up to 256 buses, but 256 buses may not sufficient for many large systems, as explained above.

In the embodiment of FIGS. 1A and 1B, the device 100 includes a service unit 110 and a plurality of processors 120, 122-1 and 122-2. The service unit 110 may include, for example, a hardware device including electronic circuitry for implementing the functionality described below, such as control logic and/or memory. In addition or as an alternative, the service unit 110 may be implemented as a series of instructions encoded on a machine-readable storage medium and executable by a processor. The processors 120, 122-1 and 122-2 may be, a central processing unit (CPU), a semiconductor-based microprocessor, a graphics processing unit (GPU), or other hardware devices suitable for retrieval and execution of instructions.

For example, the service unit 110 may be a separate computer system within the device that allows some service tasks, such as system restart or PCI configuration. The service unit 110 may be available as long as the service unit 110 is supplied with power, even when a main operating system (OS) of the device 100 is shut down, defective or not installed at all.

FIG. 1A shows a state of the device 100 after the device 100 has started to boot from system firmware (not shown), such as a Basic Input/Output System (BIOS). As the system firmware may consist of 32-bit instructions, the device 100 may be in a 32-bit mode. Thus, each of the processors 120, 122-1 and 122-2 are to initially have access to different buses 132 of a Peripheral Component Interconnect (PCI) segment 130 using a 32-bit based memory mapped configuration (not shown).

As explained above, the PCI specification permits a single system or segment to host up to only 256 buses. The term bus may define a low level interface between a CPU and a peripheral device. For example, the master processor 120 may have access to busses 132 numbered 0-84 of the PCI segment 130, the first slave processor 122-1 may have access to busses 132 numbered 85-169 of the PCI segment 130 and the second slave processor 122-1 may have access to busses 132 numbered 170-255 of the PCI segment 130. Thus, as shown in FIG. 1A, each of the processors 120, 122-1 and 122-2 may initially include memory mapped configurations that limit their access to only part of the PCI segment 130, where no two processors 120, 122-1 and 122-2 have access to the same bus 132.

Figure 2:
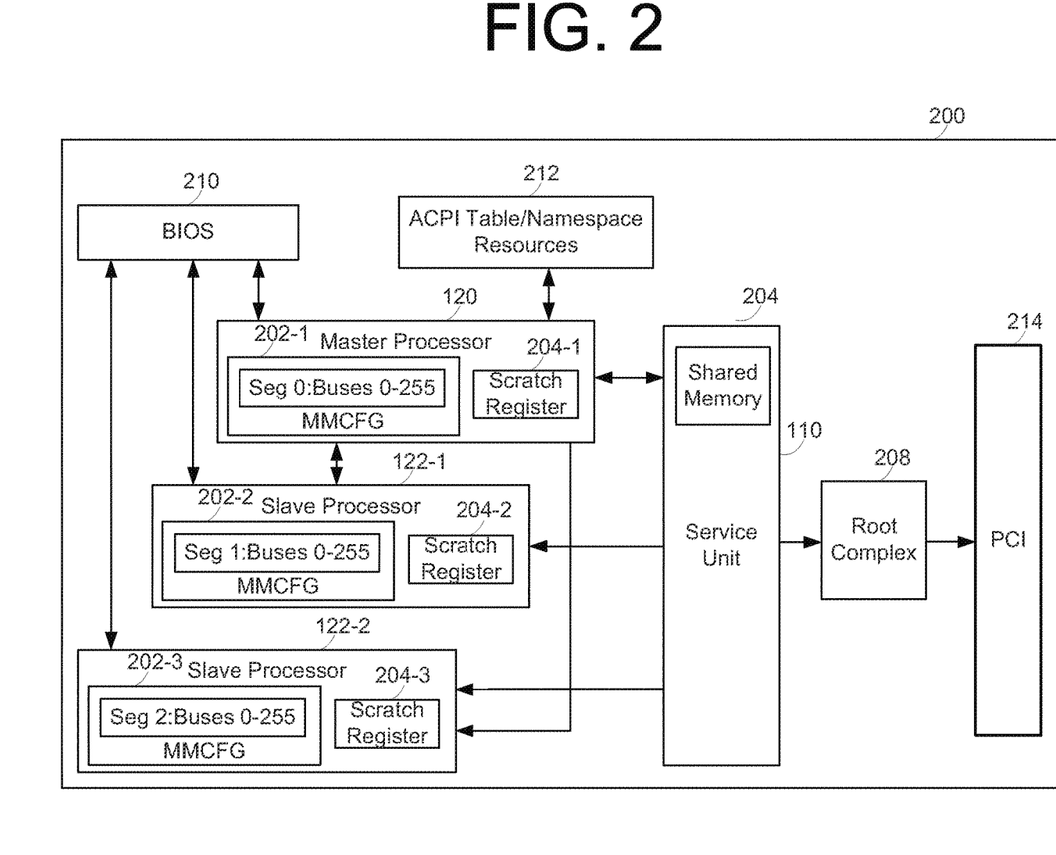
FIG. 2 is another example block diagram of a device for assigning processors to a memory mapped configuration.

The service unit 110 may then select one of the processors 120 to be a master processor. The master processor 120 may next quiesce one or more slave processors 122-1 and 122-2 running on the device 100. While FIG. 2 shows two slave processors 122-1 and 122-2, embodiments may include more or less than two slave processors. The term quiesce may refer pausing or altering the state of running processes on a computer or processor, such as those that might modify information related to memory accesses, such as a write request.

The quiesced processors 120, 122-1 and 122-2 may not transmit traffic over a fabric external to the processors 120, 122-1 and 122-2 and may not carry out operations via the memory mapped configuration. After the master processor 120 indicates the one or more slaves processors 122-1 and 122-2 are quiesced, the service unit 110 may switch the device 100 to a 64-bit memory mapped configuration via a sideband mechanism, such as a Platform Environment Control Interface (PECI) and/or a System Management Bus (SMBus).

The service unit 110 configures one or more resources of the device 100 to switch the PC segment 130 to the 64-bit memory mapped configuration. For example, the service unit 110 may reset a base number of a PCI domain of each of the processors 120 and 122-1 and 122-2 to zero, where the base number is stored in the memory mapped configuration of each of the processors 120 and 122-1 and 122-2.

Further, the service unit 110 may configure each root-complex (not shown) to decode according to the 64-bit memory mapped configuration. The term root complex may refer to a device that connects a processor and memory subsystem to a PCI switch fabric composed of one or more switch devices (not shown). Switching the device 100 to a 64-bit memory mapped configuration is explained below with respect to FIG. 2. In addition, the service unit 110 may pre-enable (but not allow use of) the 64-bit memory mapped configuration, such as by programming addresses and setting registers (not shown) for the PCI. For example, the service unit 100 may set the registers to specify a range of the busses available to each of the processors 120, 122-1 and 122-2.

As shown in FIG. 1B, after the service unit 100 switches the device 100 to the 64-bit memory mapped configuration, each of the processors 120, 122-1 and 122-2 is assigned one of a plurality of instances 130-0 to 130-2 of the PCI segment 130. Each of the instances 130-0 to 130-2 is to have access to all of the buses 132. For example, by switching to the 64-bit memory mapped configuration, the service unit 110 may be able create an additional, multi-bit instance field (not shown) within the memory-mapped configuration of each of the processors 120, 122-1 and 122-2. Further, as explained above, the service unit 110 may configure the root-complex 208 to decode according to the 64-bit memory mapped configuration.

For example, a value "00" within the instance field of the master processor 120 may indicate that it is assigned to a first instance 130-0 of the PCI segment. While a value "01" within the instance field of the first slave processor 122-1 may indicate that it is to a second instance 130-1 of the PCI segment. Similarly, a value "10" within the instance field of the second slave processor 122-2 may indicate that it is assigned to a third instance 130-0 of the PCI segment. By creating the instances 130-0 to 130-2 of the PCI segment 130 within the processors 120, 122-1 and 122-2, each of the processors 120, 122-1 and 122-2 may have access to a maximum number or greater of busses 132, as allowed per PCI segment 130 by the PCI specification, such as 256 busses.

The service unit 110 is to switch to the 64-bit memory mapped configuration not only after the device 100 has started to boot from a Basic Input/Output System (BIOS) but also prior to handing off system resources to an operating system (OS) of the device 100, such as a device driver. Thus, embodiments may allow a plurality of processors 120, 122-2 and 122-2 on a single device 100 to have access to a greater number of PCI buses 132 without modifying system firmware, such as to another format like 64-bit mode.

FIG. 2 is another example block diagram of a device 200 for assigning processors to a memory mapped configuration. The device 200 may be, for example, a server, a secure microprocessor, a notebook computer, a desktop computer, an all-in-one system, a network device, a controller, a wireless device, or any other type of device that is to interface with a Peripheral Component Interconnect (PCI). Further, the device 200 of FIG. 2 may include at least the functionality and/or hardware of the device 100 of FIG. 1.

For instance, the service unit 110, master processor 120 and slave processors 122-1 and 122-2 included in the device 200 of FIG. 2 may respectively include the functionality of the service unit 110, master processor 120 and slave processors 122-1 and 122-2 included in the device 100 of FIG. 1. Further, the device 200 of FIG. 2 also includes a root complex 208, BIOS 210, an ACPI table/namespace resource 212 and PCI 214.

The BIOS 210 and ACPI table/namespace resource 212 may include, for example, a hardware device including electronic circuitry for implementing the functionality described below, such as control logic and/or memory. In addition or as an alternative, the BIOS 210 and ACPI table/namespace resource 212 may be implemented as a series of instructions or microcode encoded on a machine-readable storage medium and executable by a processor. The PCI 214 may provide a hardware and/or firmware interface for connecting one or more PCI peripheral devices (not shown) to the one or more the processors 120, 122-1 and 122-2 of the device 200.

In FIG. 2, the master processor 120 is shown to write to a shared memory 204 of the service unit 110 to indicate that the one or more slave processors 122-1 and 122-2 are quiesced. The service unit 110 is to receive control of the device 200 from the master processor 120 after the one or more slave processor are quiesced 122-1 and 122-2

The service unit 110 is to return control of the device 200 to the processors 120, 122-1 and 122-2 after the service unit 110 switches to the 64-bit memory mapped configuration. For example, the service unit 110 may enable a flag at a scratch register 204-1 to 204-3 of one or more of the processors 120, 122-1 and 122-2 after the service unit 110 switches to the 64-bit memory mapped configuration. In the meantime, the BIOS 210 may instruct the quiesced processors 120, 122-1 and 122-2 to poll their scratch registers 204-1 to 204-3 to determine if the flag is enabled. If the flag is enabled, the quiesced processors 120, 122-1 and 122-2 may transition from a quiesced state back to an active state. The service unit 110 is to transfer control of the device to the processors 120, 122-1 and 122-2, if the flag is enabled.

As explained above in FIG. 1, after the service unit 110 switches to the 64-bit memory mapped configuration, each of the processors 120, 122-1 and 122-2 is assigned to have a different instance of a PCI segment, with each instance having access to all PCI buses. For example, a memory mapped configuration (MMCFG) 202-1 of the master processor 120 may have access to a first instance (PCI segment 0), a MMCFG 202-2 of the first slave processor 122-1 may have access to a second instance (PCI segment 1) and a MMCFG 202-3 of the second slave processor 122-2 may have access to a third instance (PCI segment 2), with each instance (PCI segments 0-2) having 256 buses (0-255).

After the flag is enabled, the master processor 120 may walk the PCI busses to assign resources to the PCI segments (PCI segments 0-2). The master processor 120 may also construct Advanced Configuration and Power Interface (ACPI) static tables and namespace resources 212 to expose information related to the segments to an OS (not shown) of the device 200.

For example, the master processor 120, via the OS or firmware, may query all PCI buses at startup time (via PCI Configuration Space) to find out what devices are present and what system resources (memory space, I/O space, interrupt lines, etc.) each needs. Then the master processor 120 may allocate the resources and tell each device its allocation. While embodiments refer to 32 and 64 bit modes, embodiments are not limited thereto and may include other bit modes as well.

Figure 3:
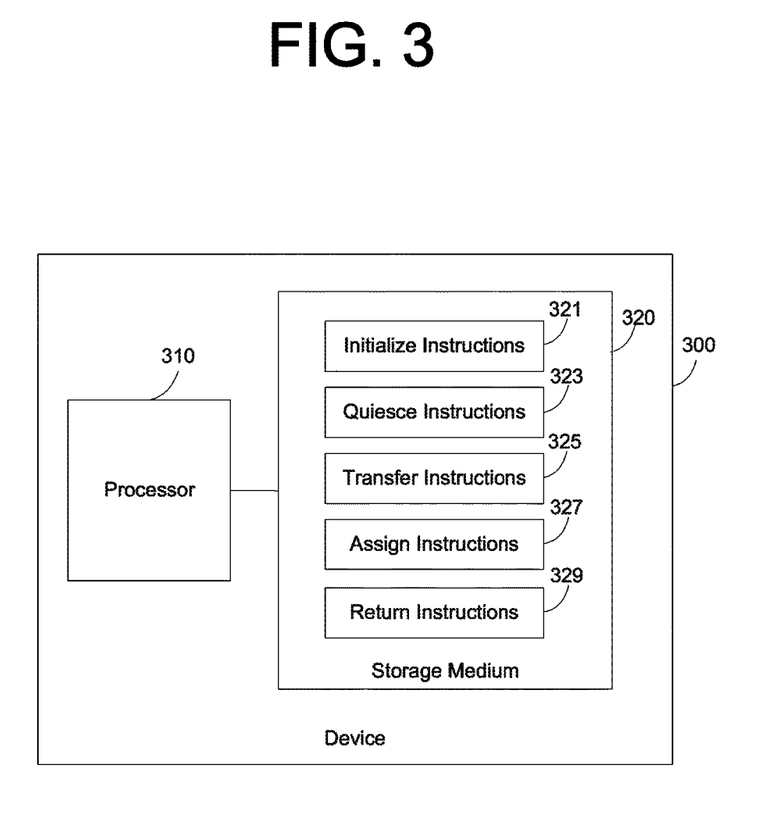
FIG. 3 is an example block diagram of a computing device including instructions for assigning processors to a memory mapped configuration.

FIG. 3 is an example block diagram of a computing device 300 including instructions for assigning processors to a memory mapped configuration. In the embodiment of FIG. 3, the computing device 300 includes a processor 310 and a machine-readable storage medium 320. The machine-readable storage medium 320 further includes instructions 321, 323, 325, 327 and 329 for assigning processors (not shown) to a memory mapped configuration.

The computing device 300 may be, for example, a secure microprocessor, a notebook computer, a desktop computer, an all-in-one system, a server, a network device, a controller, a wireless device, or any other type of device capable of executing the instructions 321, 323, 325, 327 and 329. In certain examples, the computing device 300 may include or be connected to additional components such as memories, controllers, processors etc.

The processor 310 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 320, or combinations thereof. The processor 310 may fetch, decode, and execute instructions 321, 323, 325, 327 and 329 to implement assigning the processors to the memory mapped configuration. As an alternative or in addition to retrieving and executing instructions, the processor 310 may include at least one integrated circuit (IC), other control logic, other electronic circuits, or combinations thereof that include a number of electronic components for performing the functionality of instructions 321, 323, 325, 327 and 329.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for assigning the processors to the memory mapped configuration.

Figure 4:
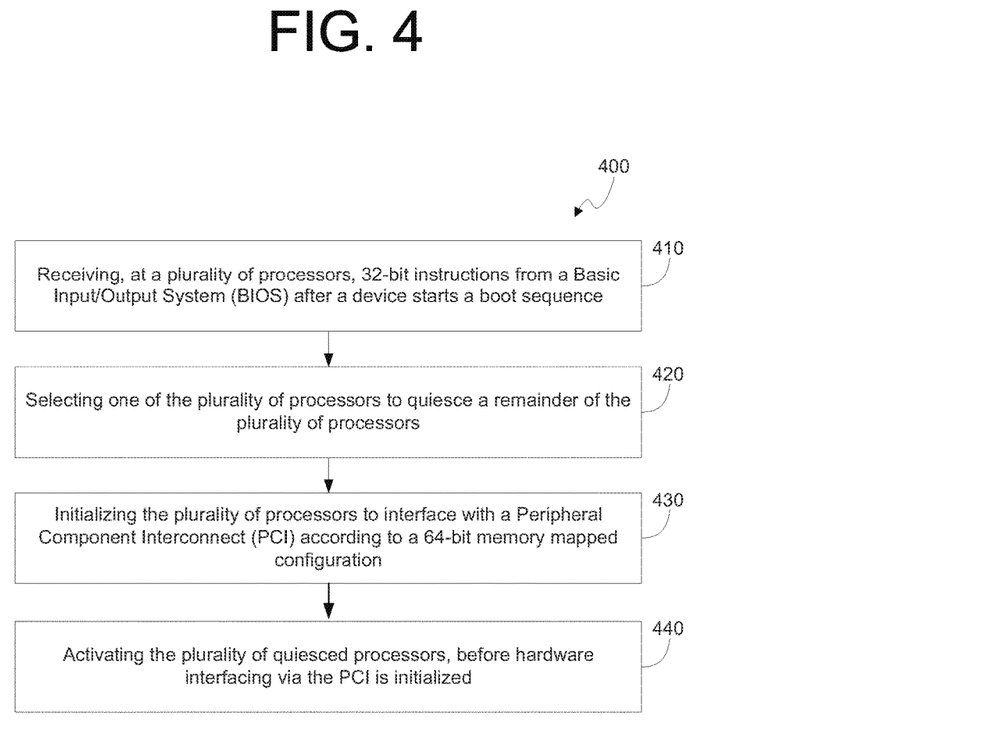
FIG. 4 is an example flowchart of a method for assigning processors to a memory mapped configuration.

Moreover, the instructions 321, 323, 325, 327 and 329 when executed by a processor (e.g., via one processing element or multiple processing elements of the processor) can cause the processor to perform processes, such as, the process of FIG. 4. For example, the initialize instructions 321 may be executed by the processor 310 to initialize a plurality of processors to access different buses of a Peripheral Component Interconnect (PCI) segment, each of the different buses assigned to only one of the plurality of processors. The quiesce instructions 323 may be executed by the processor 310 to quiesce the plurality of processors.

The transfer instructions 325 may be executed by the processor 310 to transfer control of the device from at least one of the quiesced processors to a service unit (not shown). The assign instructions 327 may be executed by the processor 310 to assign, via the service unit, each of the plurality of processors a memory mapped configuration that accesses all of the buses, with each of the processors assigned to different instances of the PCI segment, before an operating system (OS) of the device is loaded. The return instructions 329 may be executed by the processor 310 to return control of the device from the service unit to at least one of the quiesced processors. The PCI buses are to be walked and an Advanced Configuration and Power Interface (ACPI) setup (not shown), after control is returned the at least one of quiesced processor.

FIG. 4 is an example flowchart of a method 400 for assigning processors to a memory mapped configuration. Although execution of the method 400 is described below with reference to the device 200, other suitable components for execution of the method 400 can be utilized, such as the device 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, a plurality of processors 120, 122-1 and 122-2 receive 32-bit instructions from a BIOS 210 after a device starts a boot sequence. Then, at block 420, one of the plurality of processors 120 is selected to quiesce a remainder of the plurality of processors 122-1 and 122-2. Next, at block 430, the plurality of processors 120, 122-1 and 122-2 are assigned, such as by the service unit 110 to interface with a PCI 214 according to a 64-bit memory mapped configuration 202-1 to 202-3.

Each of the plurality of processors 120, 122-1 and 122-2 are to access separate buses 132 of a single PCI segment 130, before the assigning at block 430. Each of the plurality of processors 120, 122-1 and 122-2 are to access all of the buses 132 of different instances 130-0 to 130-2 of the PCI segment 130 bus, after the assigning at block 430. At block 440, the plurality of quiesced processors 120, 122-1 and 122-2 are activated, before hardware interfacing via the PCI is initialized.

According to the foregoing, embodiments provide a method and/or device for postponing enablement of multiple PCI segments until hardware initialization is complete. Thus, embodiments may provide greater PCI bus numbers while still allowing for system firmware code that is dependent on a Single PCI Segment configuration to run unmodified. As a result, embodiments may be simple to implement because a complexity associated with re-writing 32-bit code to make it 64-bit compliant, is reduced or eliminated. For example, embodiments may allow for supporting a single PCI segment during early boot and then using a processor, such as a Service Processor, to properly enable additional PCI segments prior to handing off system resources to an OS.

We claim:

1. A device, comprising:
   a Peripheral Component Interconnect (PCI) segment including a certain number of buses;
   a master processor and one or more slave processors, wherein at a booting of the device, each of the master and slave processors is to have access to a different subset of the buses of the PCI segment such that the master and slave processors do not have access to the same buses, wherein the master and slave processors are central processing units (CPUs); and
   a service unit to control the master and slave processors, wherein subsequent to the booting of the device, the master processor is to quiesce the one or more slave processors, wherein to quiesce is to pause a running process of the one or more slave processors, and
   after the master processor indicates that the one or more slave processors are quiesced, the service unit is to assign each of the master and slave processors to one of a plurality of instances of the PCI segment causing each of the master and slave processors to have access to all of the buses of the PCI segment at different instances of the PCI segment.

2. The device of claim 1, wherein the service unit is to switch from a 32-bit memory mapped configuration to a 64-bit memory mapped configuration via a sideband mechanism, and the sideband mechanism is one of a Platform Environment Control Interface (PECI) and a System Management Bus (SMBus).

3. The device of claim 1, wherein the service unit is to switch from a 32-bit memory mapped configuration to a 64-bit memory mapped configuration after the device has started to boot from a Basic Input/Output System (BIOS) and prior to handing off system resources to an operating system (OS) of the device.

4. The device of claim 1, wherein
   the master processor is to write to a shared memory of the service unit to indicate that the one or more slave processors are quiesced,
   the service unit is to receive control of the device from the master processor after the one or more slave processors are quiesced, and
   the service unit is to return the control of the device to the master processor after the service unit assigns each of the master and slave processors to one of the plurality of instances of the PCI segment and switches from a 32-bit memory mapped configuration to a 64-bit memory mapped configuration.

5. The device of claim 4, wherein
   the quiesced processors are to poll a scratch register of each of the quiesced processors to determine whether a flag at the scratch register is enabled, and
   the service unit is to enable the flag after the service unit switches to the 64-bit memory mapped configuration.

6. The device of claim 5, wherein in response to a determination that the flags of the quiesced processors are enabled, the quiesced processors are to transition from a quiesced state to an active state and the service unit is to transfer the control of the device back to the master processor.

7. The device of claim 5, wherein after the flags of the quiesced processors are enabled, the master processor is to:
   assign resources to the PCI segment, and
   construct Advanced Configuration and Power Interface (ACPI) static tables and namespace resources to expose information related to the PCI segment to the operating system (OS) of the device.

8. The device of claim 1, wherein the service unit is to pre-enable a 64-bit memory mapped configuration, including programming addresses and setting registers, after the master processor quiesces the one or more slave processors.

9. The device of claim 1, wherein
   an access to a 32-bit memory mapped configuration is in a 32-bit range before the service unit switches to the 32-bit memory mapped configuration to a 64-bit memory mapped configuration, and
   hardware of the device is initialized after the service unit switches to the 64-bit memory mapped configuration.

10. The device of claim 1, wherein the quiesced processors do not transmit traffic over a fabric external to the processors, and do not carry out operations via the memory mapped configuration.

11. The device of claim 1, wherein
the service unit is to configure resources of the device to switch the PCI segment from a 32-bit memory mapped configuration to a 64-bit memory mapped configuration, and
to configure the resources, the service unit is to set a base number of a PCI domain of each of the processors to zero and configure each root-complex to decode the 64-bit memory mapped configuration.

12. The device of claim 1, wherein the service unit is to select one of the processors to be the master processor to control the one or more slave processors.

13. A method, comprising:
initializing, by a processing unit of a device, a plurality of processors, wherein at the initialization, each of the plurality of processors has access to a different subset of buses of a Peripheral Component Interconnect (PCI) segment using a 32-bit memory mapped configuration such that no two processors have access to the same buses, wherein the plurality of processors are central processing units (CPUs);
subsequent to the initialization, selecting one of the plurality of processors as a master processor to quiesce the plurality of processors, wherein to quiesce is to pause a running process of the plurality of processors;
after the plurality of processors are quiesced, assigning each of the plurality of processors to one of a plurality of instances of the PCI segment according to a 64-bit memory mapped configuration to cause each of the plurality of processors to have access to all of the buses of the PCI segment at different instances of the PCI segment; and
after the plurality of processors are assigned to the different instances of the PCI segment according to the 64-bit memory mapped configuration, activating the plurality of quiesced processors.

14. The method of claim 13, wherein before the assigning, each of the plurality of processors is to access separate buses of a single PCI segment, and after the assigning, each of the plurality of processors is to access all of the buses of the different instances of the PCI segment.

15. The method of claim 13, further comprising:
after the plurality of processors are quiesced, receiving, by the service unit, control of the device from the master processor, and
after the plurality of processors are assigned to interface with the PCI segment according to the 64-bit memory mapped configuration, returning the control of the device from the service unit to the master processor.

16. The method of claim 15, further comprising:
determining whether a flag at a register of each of the quiesced processors is enabled, and
in response to a determination that the flag of the respective processor is not enabled, enabling the flag and transitioning the respective processor from a quiesced state to an active state.

17. A non-transitory computer-readable storage medium storing instructions that, when executed by a processor of a device, cause the processor to:
initialize a plurality of processors, wherein at the initialization, each of the plurality of processors has access to a different subset of buses of a Peripheral Component Interconnect (PCI) segment, each of the different buses of the PCI segment is assigned to only one of the plurality of processors, wherein the plurality of processors are central processing units (CPUs);
subsequent to the initialization, quiesce the plurality of processors, wherein to quiesce is to pause a running process of the plurality of processors:
after the plurality of processors are quiesced, transfer control of the device from one of the quiesced processors to a service unit of the device;
assign, via the service unit, each of the quiesced processors to one of a plurality of instances of the PCI segment according to a memory mapped configuration that accesses all of the buses, with to cause each of the quiesced processors assigned to have access to all of the buses of the PCI segment at different instances of the PCI segment, before an operating system (OS) of the device is loaded; and
after each of the quiesced processors is assigned to the memory mapped configuration that accesses all of the buses different instances of the PCI segment, activate the quiesced processors and return the control of the device from the service unit to the one of the quiesced processors.

18. The non-transitory computer-readable storage medium of claim 17, wherein after the control is returned to the one of the quiesced processors, the instructions are to cause the processor of the device to assign resources to the buses of the PCI segment and construct an Advanced Configuration and Power Interface (ACPI) setup.

19. The non-transitory computer-readable storage medium of claim 17, wherein
before each of the processors is assigned to the different instances of the PCI segments, the processors are not allowed to access the same buses of the PCI segment, and
after each of the processors is assigned to the different instances of the PCI segment, the processors are allowed to access to the same buses of the PCI segment at different instances of the PCI segment.

20. The non-transitory computer-readable storage medium of claim 17, wherein the instructions are to cause the processor to:
determine whether a flag at a register of each of the quiesced processors is enabled, and
in response to a determination that the flag of the respective processor is not enabled, enable the flag and transition the respective processor from a quiesced state to an active state.

* * * * *